UNITED STATES PATENT OFFICE.

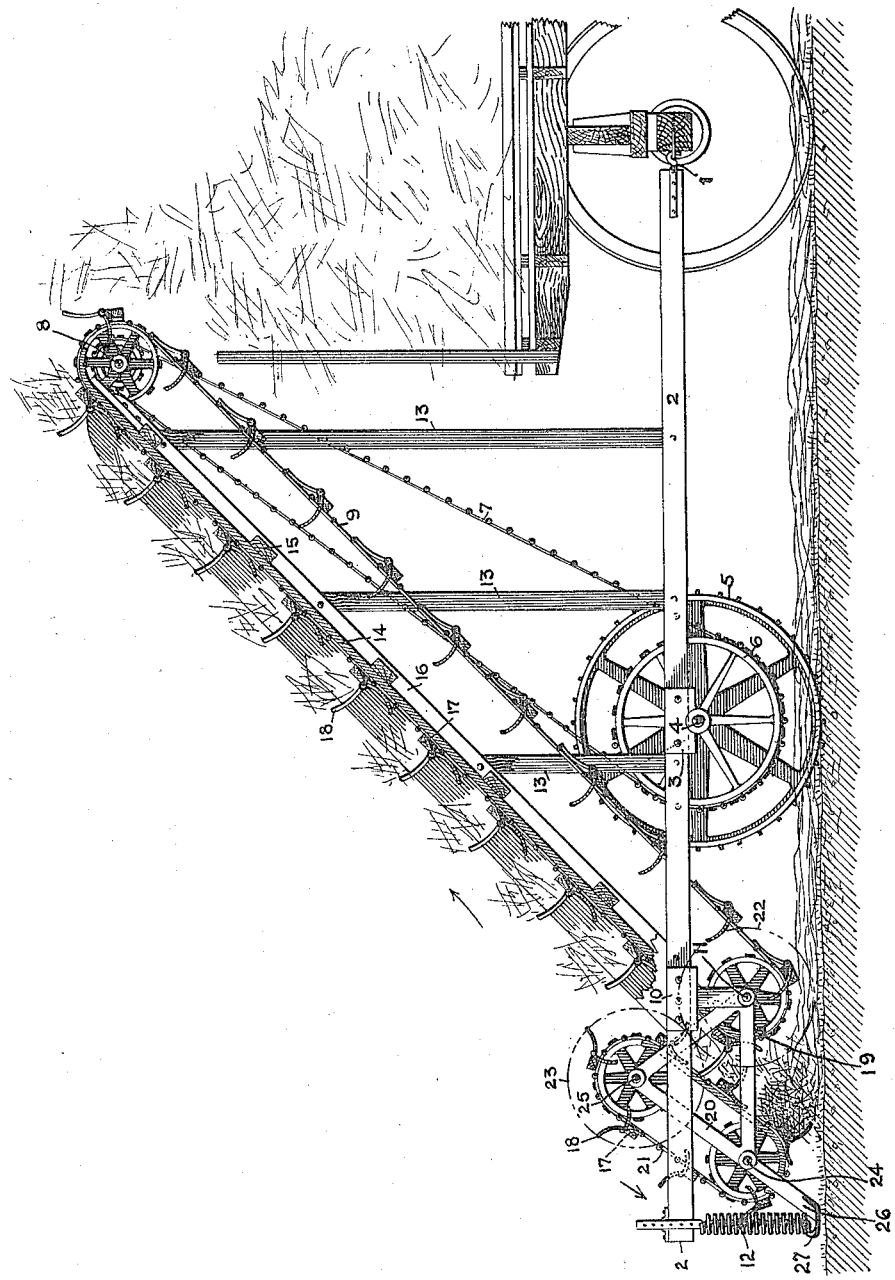

JOHN D. MUSSER, OF EASTON, OHIO; JACOB MUSSER ADMINISTRATOR DE BONIS NON, OF SAID JOHN D. MUSSER, DECEASED.

HAY-LOADER.

1,158,536.            Specification of Letters Patent.        Patented Nov. 2, 1915.

Application filed April 2, 1910. Serial No. 553,050.

*To all whom it may concern:*

Be it known that I, JOHN D. MUSSER, a citizen of the United States, residing at Easton, in the county of Wayne and State of Ohio, have invented certain new and useful Improvements in Hay-Loaders, of which the following is a specification.

My invention relates to improvements in hay loaders and it appertains more especially to the specific features pointed out in the annexed claims.

The purpose of my invention is to provide simple and efficient means for cleanly and rapidly loading hay without raking it into windrows. To make a device that shall operate while under continuous movement, discarding reciprocatory or vibratory means for gathering the hay and bringing it into reach of the endless "web" that is to convey it to the wagon. To provide means for automatically adjusting the gathering device to inequalities of the surface over which the loader is being drawn and to balance the weight of the loader mechanism on its driving wheels so that a lighter form of structure can be used.

With these ends in view, I show in the accompanying drawing such an instance of adaptation as will disclose the features of the invention without limiting myself to the specific details shown.

The drawing shows a side elevation, partly in section of a hay loader in action.

The loader is attached in the usual manner to the rear axle of the wagon being loaded, by means of a hook, 1, or clevis fastened to the main frame 2. To this frame two bearings, 3, are secured in which the driving axle, 4, is held. On this axle the usual driving wheels, 5, are placed, subject to a pawl and ratchet connection of usual construction. A sprocket driving wheel, 6, may be secured to one of the driving wheels on the outside thereof or on the shaft itself as desired. This, through a sprocket chain, 7, drives the upper elevator shaft, 8, which in turn operates the "web" 9, to convey the hay to the wagon. The frame, 2, also supports, in bearings, 10, the lower conveyer shaft, 11, and a pair of spring supports, 12, adapted to hold the gathering device in flexible suspension. Suitable supports, 13, serve to hold the conveyer boards, 14, in position through cross bars, 15, and longitudinal bars, 16. The "web" 9, is made up of two endless chains running over a pair of sprocket wheels on each of the shafts, 8, and, 11.

Slats, 17, are fastened to the links, at certain distances apart. These slats carry tilting hooks, 18, that are pivoted to the bars and they have a control extension which rides on the conveyer boards, 14, serving to hold the hooks erect while carrying the hay up the conveyer. When the top is reached the control end leaves the floor, 14, and the hooks, subjected to gravity, assume the position shown in the descending portion of the chain "web" 9. As the hooks reach the lower end they engage a curved extension, 19, of the floor 14, which instantaneously throws them into action so as to gather the hay from the ground and lift it into the conveyer.

To assist the conveyer and to insure the clean gathering of the hay, a supplemental device is used as shown. This is supported on a pair of triangular frames, 20, pivoted on the shaft, 11. These frames support a short length of "web" 21, which is a duplicate of the "web" 9. Its hooks serve to assist the main hooks in gathering the hay and delivering it to them for conveyance to the wagon being loaded. This short web is driven by a pair of gears, 22, 23. This arrangement permits the lower pair of sprocket wheels mounted on shaft, 24, and the upper pair on shaft, 25, as well as the frame 20, to rise up and down to accommodate itself to any unevenness of ground that they may be drawn over.

Extensions or feet 26 of the frames 20 descend rearwardly to engage the ground. At their lower ends a rearwardly bent shoe 27 is attached to take any wear that may be incurred. The parts of this supplemental device are suspended from a pair of springs 12 which are adjustable. These springs may be so adjusted that for most of the time shoes 27 engage the ground. They serve to relieve the mechanism from shock in passing over deep ditches and washed out gutters, or any sudden abnormal depressions.

The principal feature, of this my invention lies in the fact that the two sets of moving hooks travel differentially with respect to the ground and uniformly with respect to each other. This will be apparent when one says the conveyer hooks move against the direction of traverse of the entire loader over the ground, while the supplemental "web" 21, moves with the travel of the loader, at the same time that the two webs, 9, and, 21, move together. The driving connection to "web" 21, comprises a pair of gears, 23, and 22, which remain in mesh independently of the up and down motion of the frame, 20.

Should it be desired, a pair of idler supporting tread wheels may be placed loosely on the shaft, 24, and a similar pair on shaft 11, making the bearings for this shaft adjustable vertically so that the gathering device will be free to rise and fall according to the unevenness of the ground on which the hay lies.

The structure is simple, direct acting and specially applicable to the varying conditions to which devices of this class are subjected. An absence of complexity insures economical manufacture, minimum repair costs and ease of operation.

What I claim is:

1. A suitable frame, supporting wheels therefor, a combined gathering and elevating device carried thereby, a supplementary gatherer, means depending therefrom and engaging the ground for automatically adjusting the same to the inequalities of the ground, and suitable actuating mechanism for imparting motion to both devices.

2. In hay loaders, the combination with a movable conveyer, a supplemental gatherer driven by the conveyer mechanism, a conveyer drive shaft, a gatherer driven shaft, interconnected driving means carried by said shafts, distancing frames serving as supports to the gathering device, and pivotal points on said frames co-axial with the drive shaft whereby the same may have movement about the axis thereof without disturbing the relation of the driving connections.

3. A main frame, elevating and gathering mechanisms supported thereon, means for driving the gathering device from the elevating mechanism, means for pivoting the gathering device to have bodily movement around the axial center of its driving connection independently of the main frame, means depending from the gatherer and engaging the ground to automatically maintain a working position of the gatherer, pivoted conveyers ascending and descending on both mechanisms for moving the hay, means adapted to cause the conveyers to be active when ascending and inactive over a part of their descent.

4. A main frame, an elevating device carried thereby, a gathering device supported thereon, means depending therefrom to engage the ground means for actuating both devices, means for pivotally supporting the gathering device, and means for limiting the extreme downward movement thereof by the depending means aforesaid.

5. A main frame, an elevating device supported thereon, a gathering device, a frame therefor, means for pivotally attaching the same to the main frame, means for actuating both devices, means for adjustably limiting extreme downward movements of the gathering frame, and depending means connected therewith for automatically adjusting the position of the gathering device through said means following the inequalities of the ground.

6. A traversing frame, an elevating device supported thereon, a pivoted gathering device, suitable driving connections and conveying hooks therefor, means for holding the conveying hooks of both devices operative while ascending, and means for causing the same to remain inoperative during the major portion of their descent.

7. A hay loader including a main frame, an elevating mechanism operative in the main frame, a gathering mechanism including a gathering frame and an endless belt conveyer operative in the gathering frame, means secured to and projecting forwardly from the gathering frame, and means for pivotally securing said forwardly projecting means to the main frame, whereby to support the gathering frame for bodily pivotal movement with relation to the main frame.

8. A hay loader including a main frame, an elevating mechanism operative therein, a gathering frame, an endless belt conveyer operative in the gathering frame, and means for supporting the gathering frame for bodily pivotal movement with relation to the main frame, said means including arms rigidly connected with and projecting forwardly from said gathering frame.

9. A hay loader including a main frame, an elevating mechanism operative therein, a gathering frame, an endless belt conveyer operative in the gathering frame, and connecting means between the gathering frame and main frame to at all times maintain the delivery end of the belt conveyer vertically above the elevating mechanism, said connecting means permitting a bodily pivotal movement of the gathering frame with relation to the main frame.

10. A hay loader including a main frame, an elevating mechanism operative therein, a gathering frame, an endless belt conveyer operative in the gathering frame, and means for pivotally supporting said gathering frame to permit bodily pivotal movement of the gathering frame with relation to the main frame, said means including posts extending from the main frame and arms pivotally connected to the posts and rigidly connected to the gathering frame.

11. A hay loader including a main frame, an elevating mechanism operative therein, a gathering frame, an endless belt conveyer operative in the gathering frame, means for pivotally supporting said gathering frame to permit bodily pivotal movement of the gathering frame with relation to the main frame, said means including posts extending from the main frame and arms pivotally connected to the posts and rigidly connected to the gathering frame, and stops secured to the gathering frame below the arms to engage the main frame and limit movement of the gathering frame in one direction.

12. A traversing frame, a combined gathering and elevating device supported thereby, a supplemental pivoted gathering device, means for actuating both devices, means for adjustably and elastically limiting the extreme downward movement of the latter, and means depending therefrom for automatically adapting the pivotal movement of the gathering device to the varying surface traversed thereby.

In testimony whereof I affix my signature in presence of two witnesses.

JOHN D. MUSSER.

Witnesses:
ARTHUR KREAKIE,
N. L. ROYER.

Copies of this patent may be obtained for five cents each, by addressing the "Commissioner of Patents, Washington, D. C."